M. S. KAHLE.
Clover Seed Gatherer.
No. 14,816.  Patented May 6, 1856.
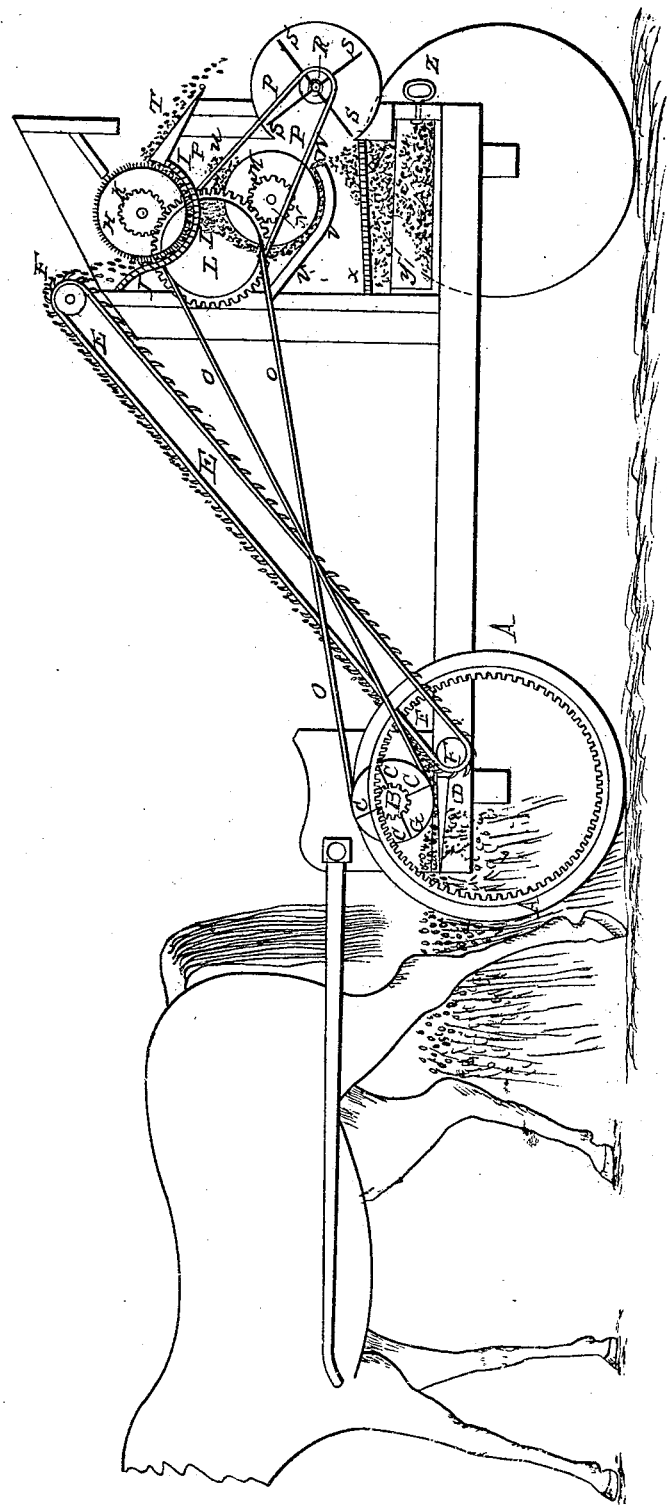

UNITED STATES PATENT OFFICE.

MATTHEW S. KAHLE, OF LEXINGTON, VIRGINIA.

IMPROVEMENT IN MACHINES FOR SAVING CLOVER-SEED.

Specification forming part of Letters Patent No. 14,816, dated May 6, 1856.

*To all whom it may concern:*

Be it known that I, MATTHEW S. KAHLE, of Lexington, in the county of Rockbridge, the State of Virginia, have invented a new and useful Machine for Saving Clover-Seed; and I do hereby declare that the following is a full and exact description thereof, reference being had to the accompanying drawings, and to the letters of reference marked thereon.

The machine is drawn forward by a horse, which gives motion to the wheels on which it is supported. The wheel A A has a cogged wheel attached to it, and as the wheel moves forward this cog communicates motion to the cog-wheel B, to the axis of which are fastened four blades, C C C C. Under this axis is placed horizontally a large rake, D, which catches the heads of clover as the machine moves forward, and the revolving blades C C C C cut them off and force them onto the points of the cloth E E E. This cloth passes over two rollers, F F. The lower one is made to revolve by a band which passes around it, and also around a wooden wheel, G, fixed on the axis of B. The cloth is thus made to move upward, and carries the clover-heads up and empties them between the rubber H and the sieve I I I. The rubber H has on its axis a cog-wheel, K, which is worked by the cogs on the circumference of the wheel L, and in the same way the rubber M and its cog-wheel N are worked. The motion in all of them is given by the band O O O. The rubber M is covered with india-rubber, and the concave board V V with shark-skin or india rubber.

In rear of the machine is a fan-wheel, which is made to revolve by the band P P P, which passes over the axis R and over the wheel L. The paddles of this fan-wheel are represented by the lines S S S S.

The clover-heads falling in between the rubber H and the sieve I I I are broken by the projecting spikes or coarse emery with which H is covered. The seed and lighter part of the pod are forced through the meshes of the sieve, and the heavier part of the clover-head thrown out at T.

The seed and light pod are prevented from falling between M and S by the shelving-board U, and pass down between the rubber M and the concave board V V. Here they are again rubbed and pass out at W, where the wind of the fan-wheel blows away the chaff, and the seed falls on the sieve X X and sifts through its meshes into the drawer Y Y and may be taken out by the handle Z.

That part of the apparatus I immediately under the rubber H is called a sieve. It is, to be sure, a sieve, but also a concave made of woven wire, its object being to separate the heads, chaff, seed, and finer parts from the grass, leaves, and weeds, which latter are thrown out at T, while the former are forced through the meshes of the concave and pass down to the thrashing-cylinder and concave below, and thence to the blast and screen, as above described. The rubber H and woven-wire concave I separates and casts off the impure from pure seeds to be saved, and thus not only relieves the thrashing or rubbing out cylinder and concave below them, but obviates an after separation of seeds, &c., which from their uniformity of size and relative specific gravity is difficult to accomplish.

Having thus fully described the nature of my invention, what I claim therein as new, and desire to secure by Letters Patent, is—

In combination with a gathering and conveying apparatus such as described, the rubber and meshed-wire concave for separating and throwing out the grass, leaves, weeds, and other impurities from the heads, pods, &c., and passing the latter to the thrashing cylinder and concave, and blast and screen underneath them, substantially as herein set forth, and for the purposes specified.

MATTHEW S. KAHLE.

Witnesses:
G. A. BAKER,
B. J. JORDAN,
J. LETCHER.